US009972161B2

(12) United States Patent
Bernard et al.

(10) Patent No.: US 9,972,161 B2
(45) Date of Patent: May 15, 2018

(54) GAMING MACHINE TOP DISPLAY

(71) Applicant: Bally Gaming, Inc., Las Vegas, NV (US)

(72) Inventors: Vernon Bernard, Las Vegas, NV (US); Karl Wudtke, Henderson, NV (US)

(73) Assignee: Bally Gaming, Inc., Las Vegas, NV (US)

(*) Notice: Subject to any disclaimer, the term of this patent is extended or adjusted under 35 U.S.C. 154(b) by 620 days.

(21) Appl. No.: 14/493,472

(22) Filed: Sep. 23, 2014

(65) Prior Publication Data

US 2016/0042591 A1 Feb. 11, 2016

Related U.S. Application Data

(63) Continuation-in-part of application No. 29/498,643, filed on Aug. 6, 2014.

(51) Int. Cl.
*A63F 13/00* (2014.01)
*G07F 17/32* (2006.01)

(52) U.S. Cl.
CPC ................................ *G07F 17/3211* (2013.01)

(58) Field of Classification Search
CPC ......................... G07F 17/3211; G07F 17/3202
USPC ........................................................... 463/31
See application file for complete search history.

(56) References Cited

U.S. PATENT DOCUMENTS

| | | | | |
|---|---|---|---|---|
| 2010/0022298 A1* | 1/2010 | Kukita | F21V 3/04 463/25 |
| 2012/0122571 A1* | 5/2012 | DeSimone | G07F 17/3216 463/31 |
| 2014/0194182 A1* | 7/2014 | Young | G07F 17/3213 463/20 |

* cited by examiner

*Primary Examiner* — David L Lewis
*Assistant Examiner* — Robert Mosser
(74) *Attorney, Agent, or Firm* — Philip J. Anderson; Marvin A. Hein, Jr.

(57) ABSTRACT

A bonus display and gaming machine with a bonus display are disclosed. The bonus display includes a square video display arranged in a diamond pattern to display content such as a bonus wheel. Back illuminated inner and outer rings are mounted to cover at least portions of the video display and are back illuminated by, for example, light emitting diodes. To accommodate one or more pointers displayed on the video display the inner ring includes a cut-out to reveal each video pointer.

14 Claims, 6 Drawing Sheets

FIG. 6
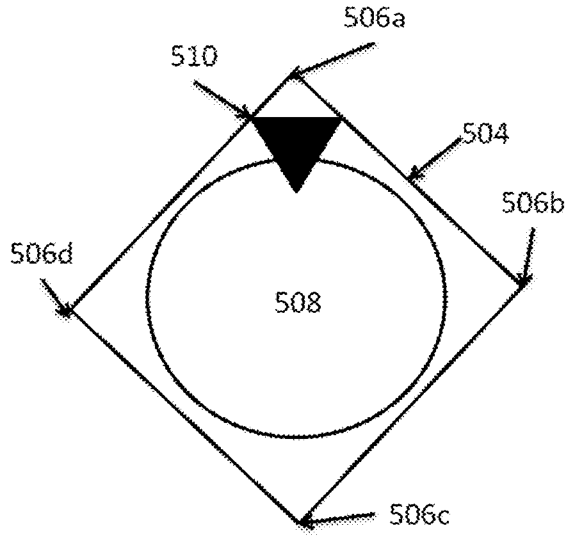
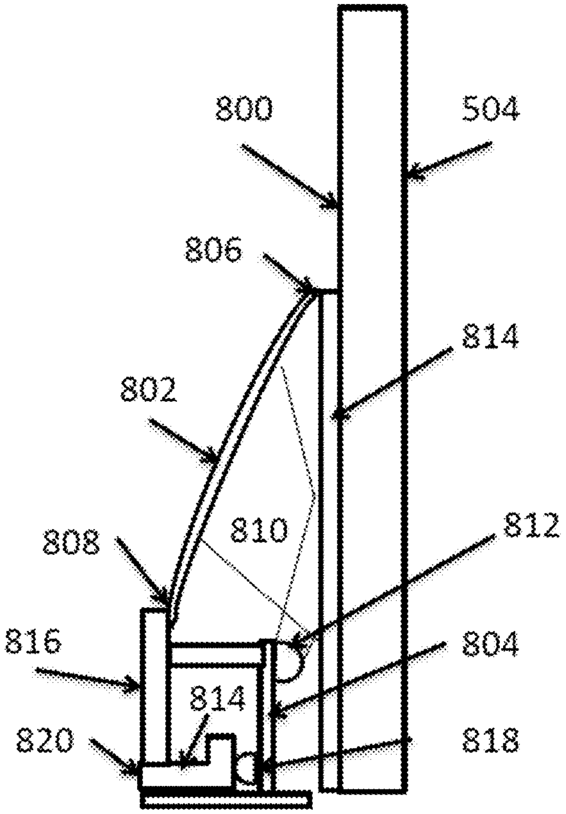
FIG. 7

GAMING MACHINE TOP DISPLAY

RELATED APPLICATIONS

This application is a continuation-in-part application of commonly owned and prior filed application Ser. No. 29/498,643 filed Aug. 6, 2014 and titled "Gaming Machine Top Display" the disclosure of which is incorporated by reference.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

1. Field of the Invention

This invention pertains generally to top displays for gaming machines and gaming terminals. More particularly it relates to the construction of such top displays to provide a striking visual effect.

2. Background

Gaming machines and gaming terminals are known to include top displays sometimes referred to as top box displays which may be used to provide a prize. They can be video or mechanical. For example in Adams, U.S. Pat. No. 5,823,874 issued Oct. 20, 1998 and titled "Method of Playing Game and Gaming device With an Additional Payout Indicator" there is disclosed a gaming machine having a top box bonus indicator embodied as a wheel. When the base game displays a triggering event the video display wheel becomes operable for the player to prompt to spin to select a prize indicated by pointer.

A drawback to prior top box bonus displays is that they are static. That is they are not easily configurable to have multiple pointers or to change the prizes. Further the visual presentation to a passer-by, while somewhat intriguing, does not present a visually striking and dynamic appearance. It would be advantageous to provide a bonus display which is configurable and which is controllable to invoke one or more striking visual "beacons" to draw players to the game.

SUMMARY OF THE INVENTION

The present invention is directed toward a gaming machine and a bonus display there for which includes a square, video, bonus display for display bonus feature content including at least a video representation of a wheel. In a preferred embodiment the video display is arranged in a diamond orientation to position its corners along vertical and horizontal axes. An annular light diffusing inner ring is disposed to surround the representation of the wheel and includes an inner rim adjoining the video display and an outer rim spaced from the video display to define and annular enclosed space behind the inner ring. An annular reflector is located adjacent the video display within the space to underlie the inner ring. A first set of light emitters such as light emitting diodes (LEDs) are located in the space and are controlled to emit light which is reflected by the reflector and illuminates the inner ring from behind to define a smoothly lighted inner ring to surround the representation of the wheel on the video display. Using reflected light avoids the LEDs creating "hot spots" at the inner ring. In an embodiment the video display is controlled to display a video pointer to interact with the representation of the wheel to select a bonus described at a sector of the wheel. In a preferred embodiment, and to conserve video display real estate the pointer is displayed at a corner of the video display whereby the representation of the wheel may occupy the greatest real estate available. The inner ring includes a recess or cut-out to accommodate the display of the pointer. In an embodiment a plurality of pointers may be displayed to different corners of the video display with inner ring recesses to accommodate each.

The gaming device and bonus display may include an outer ring spaced radially outboard of the inner ring by an opaque bezel. The outer ring is preferably fashioned as an annular "light pipe" disposed to radially pipe light from a second set of light emitters to define a bonus display having the back lit inner and outer rings spaced by the bezel. The lighting of the rings may be controlled in sequence, timing and color to provide the desired presentation. The lighting of the rings may be coordinated by the processor and/or controller to coordinate with the presentation of the base game and bonus game content.

The construction and operation of the bonus display provides a visually compelling presentation to draw players to the game. The rings can be controlled to light in a color and/or sequence to indicate the award of a bonus or a jackpot event.

Further advantages of the invention will be brought out in the following portions of the specification, wherein the detailed description is for the purpose of fully disclosing the preferred embodiment of the invention without placing limitations thereon.

BRIEF DESCRIPTION OF THE DRAWING

The present invention will be more fully understood by reference to the following drawings, which are for illustrative purposes only.

FIG. 6 illustrates the bonus display square video display showing a representation of the wheel and pointer; and FIG. 7 is a side view of a portion of the bonus display.

DESCRIPTION

Persons of ordinary skill in the art will realize that the following description of the present invention is illustrative only and not in any way limiting. Other embodiments of the invention will readily suggest themselves to such skilled persons having the benefit of this disclosure.

Figure 1:
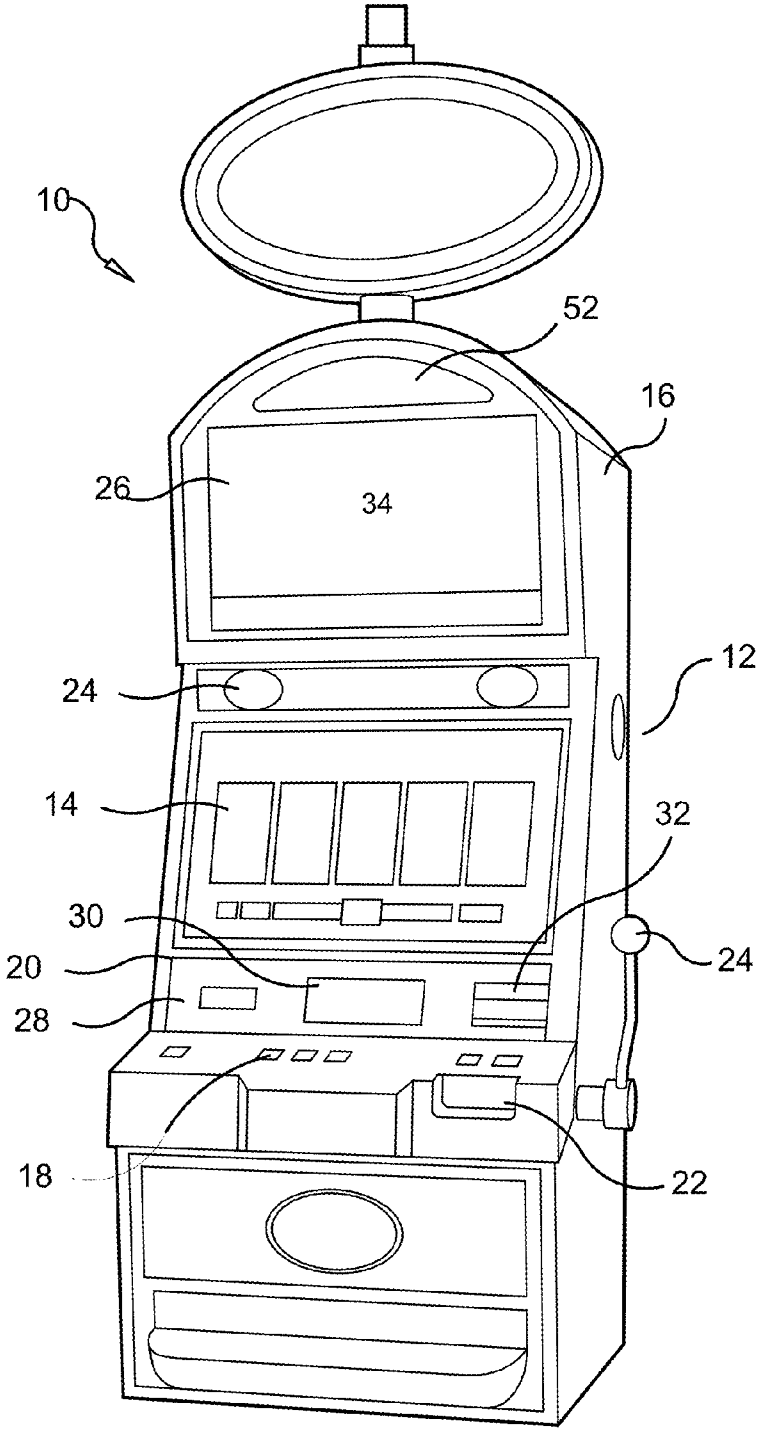
FIG. 1 illustrates a gaming device according to the art.

Referring to FIG. 1, a gaming machine 10 capable of supporting various embodiments of the invention is shown, including cabinet housing 12, primary game display 14 upon which a primary game and feature game may be displayed, top box 16 which may display multiple progressives that may be won during play of the feature game, player-activated buttons 18, player tracking panel 20, bill/voucher acceptor 22 and one or more speakers 24. Cabinet housing 12 may be a self-standing unit that is generally rectangular in shape and may be manufactured with reinforced steel or other rigid materials which are resistant to tampering and vandalism.

In one or more embodiments, cabinet housing 12 houses a processor, circuitry, and software (not shown) for receiving signals from the player-activated buttons 18, operating the one or more games, and transmitting signals to the respective displays and speakers. Any shaped cabinet may be implemented with any embodiment of gaming machine 10 so long as it provides access to a player for playing a game. For example, cabinet 12 may comprise a slant-top, bar-top, or table-top style cabinet, including a Bally Cinevision™ or CineReels™ cabinet. The operation of gaming machine 10 is described more fully below.

The plurality of player-activated buttons 18 may be used for various functions such as, but not limited to, selecting a wager denomination, selecting a game to be played, selecting a wager amount per game, initiating a game, or cashing out money from gaming machine 10. Buttons 18 may be operable as input mechanisms and may include mechanical buttons, electromechanical buttons or touch screen buttons. Optionally, a handle 24 may be rotated by a player to initiate a game.

In one or more embodiments, buttons 18 may be replaced with various other input mechanisms known in the art such as, but not limited to, a touch screen system, touch pad, track ball, mouse, switches, toggle switches, or other input means used to accept player input such as a Bally iDeck™. One other example input means is a universal button module as disclosed in U.S. application Ser. No. 11/106,212, entitled "Universal Button Module," filed on Apr. 14, 2005, which is hereby incorporated by reference. Generally, the universal button module provides a dynamic button system adaptable for use with various games and capable of adjusting to gaming systems having frequent game changes. More particularly, the universal button module may be used in connection with playing a game on a gaming machine and may be used for such functions as selecting the number of credits to bet per hand.

Cabinet housing 12 may optionally include top box 16 which contains "top glass" 26 comprising advertising or payout information related to the game or games available on gaming machine 10. Player tracking panel 20 includes player tracking card reader 28 and player tracking display 30. Voucher printer 32 may be integrated into player tracking panel 20 or installed elsewhere in cabinet housing 12 or top box 16.

Game display 14 may present a game of chance wherein a player receives one or more outcomes from a set of potential outcomes. For example, one such game of chance is a video slot machine game. In other aspects of the invention, gaming machine 14 may present a video or mechanical reel slot machine, a video keno game, a lottery game, a bingo game, a Class II bingo game, a roulette game, a craps game, a blackjack game, a mechanical or video representation of a wheel game or the like.

Mechanical or video/mechanical embodiments may include game displays such as mechanical reels, wheels, or dice as required to present the game to the player. In video/mechanical or pure video embodiments, game display 14 is, typically, a CRT or a flat-panel display in the form of, but not limited to, liquid crystal, plasma, electroluminescent, vacuum fluorescent, field emission, or any other type of panel display known or developed in the art. Game display 14 may be mounted in either a "portrait" or "landscape" orientation and be of standard or "widescreen" dimensions (i.e., a ratio of one dimension to another of at least 16×9). For example, a widescreen display may be 32 inches wide by 18 inches tall. A widescreen display in a "portrait" orientation may be 32 inches tall by 18 inches wide. Additionally, game display 14 preferably includes a touch screen or touch glass system (not shown) and presents player interfaces such as, but not limited to, credit meter (not shown), win meter (not shown) and touch screen buttons (not shown). An example of a touch glass system is disclosed in U.S. Pat. No. 6,942,571, entitled "Gaming Device with Direction and Speed Control of Mechanical Reels Using Touch Screen," which is hereby incorporated by reference in its entirety for all purposes.

Game display 14 may also present information such as, but not limited to, player information, advertisements and casino promotions, graphic displays, news and sports updates, or even offer an alternate game. This information may be generated through a host computer networked with gaming machine 10 on its own initiative or it may be obtained by request of the player using either one or more of the plurality of player-activated buttons 18; the game display itself, if game display 14 comprises a touch screen or similar technology; buttons (not shown) mounted about game display 14 which may permit selections such as those found on an ATM machine, where legends on the screen are associated with respective selecting buttons; or any player input device that offers the required functionality.

Cabinet housing 12 incorporates a single game display 14. However, in alternate embodiments, cabinet housing 12 or top box 16 may house one or more additional displays 34 or components used for various purposes including additional game play screens, animated "top glass," progressive meters or mechanical or electromechanical devices (not shown) such as, but not limited to, wheels, pointers or reels. The additional displays may or may not include a touch screen or touch glass system.

Figure 2A:
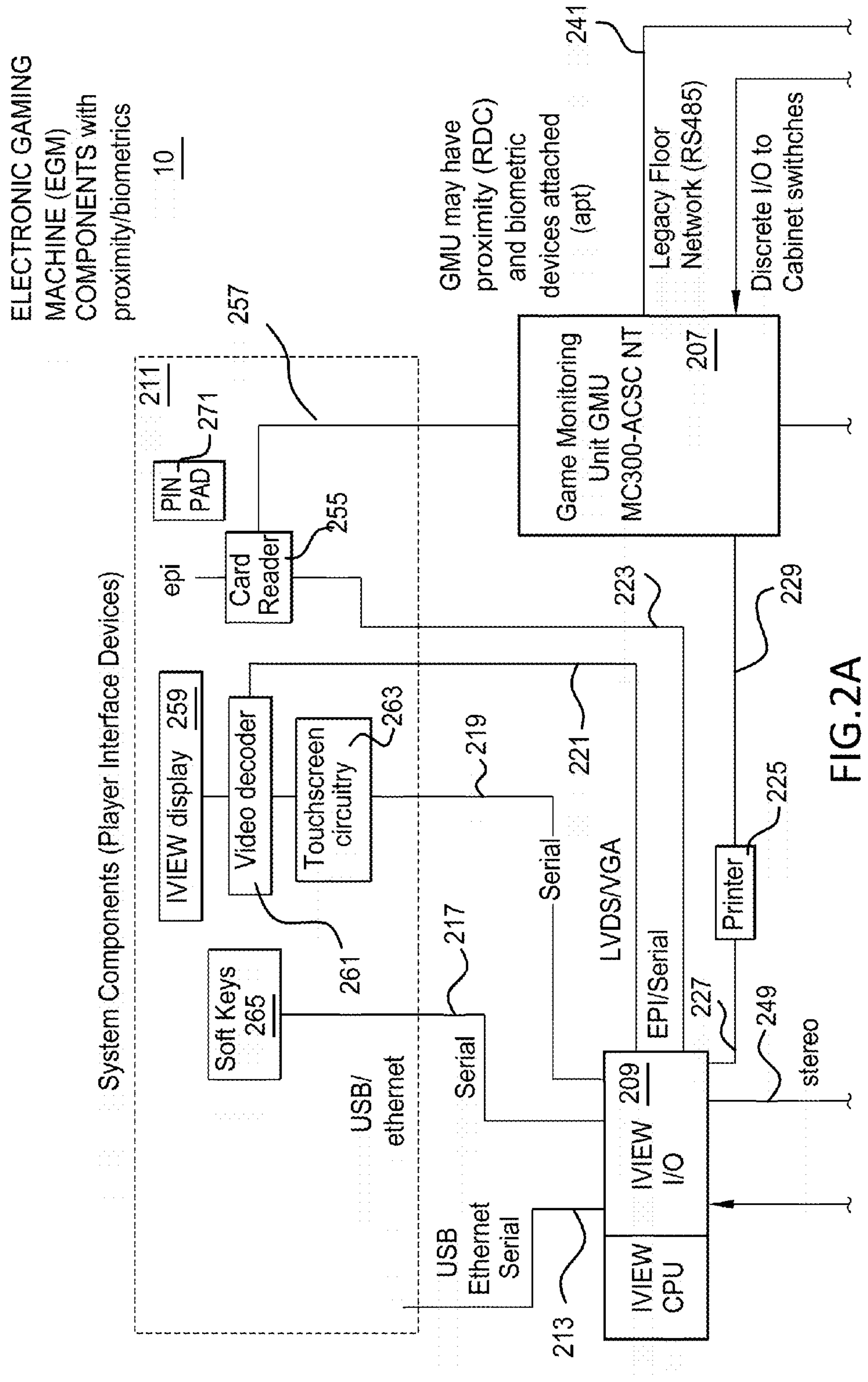
FIGS. 2A-2B illustrate an example of a gaming device operational platform and components.
Figure 2B:
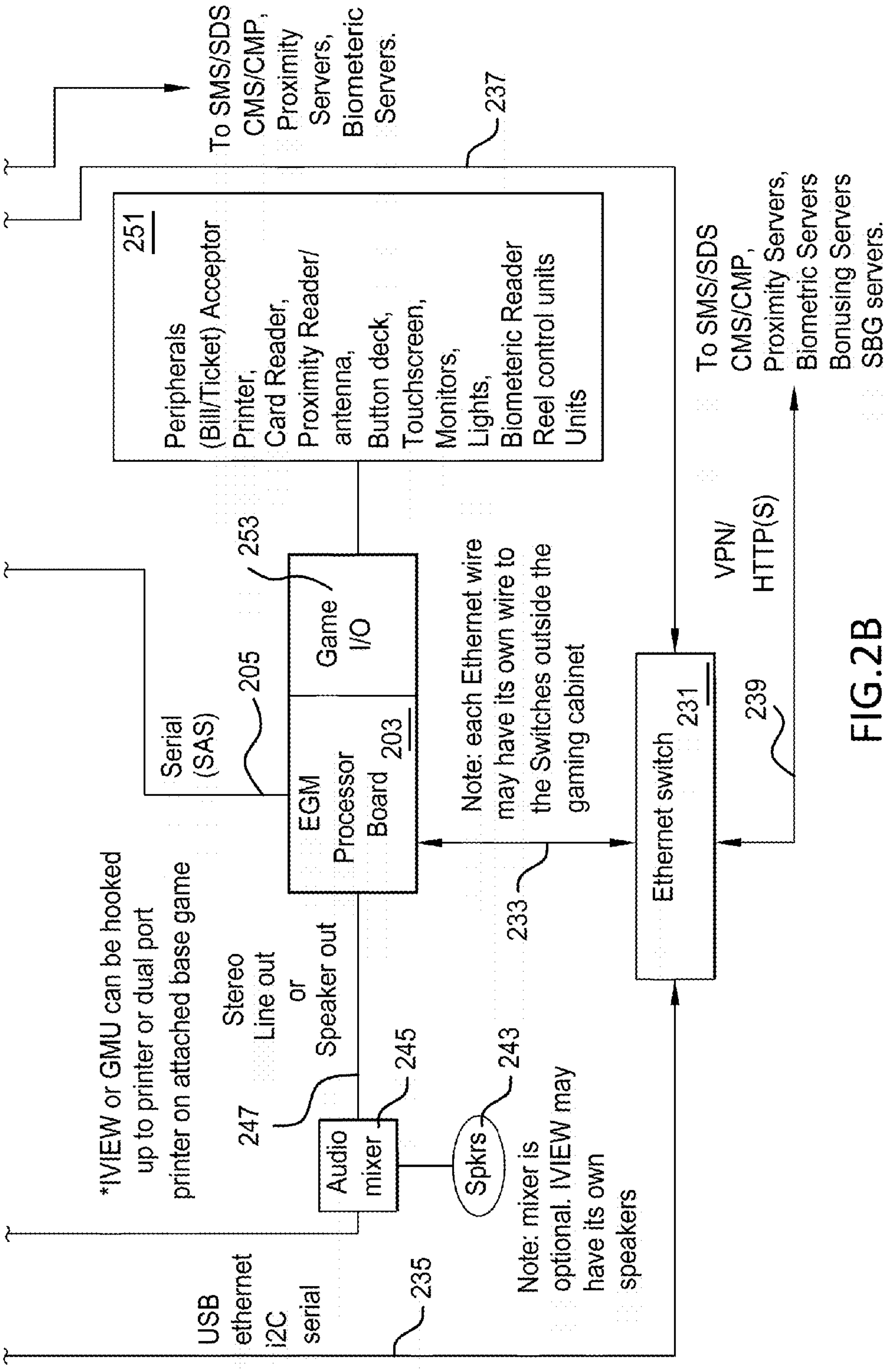

Referring to FIGS. 2A and 2B, electronic gaming machine 10 is shown in accordance with one or more embodiments. Electronic gaming machine 10 includes base game integrated circuit board 203 (EGM Processor Board) connected through serial bus line 205 to game monitoring unit (GMU) 207 (such as a Bally MC300 or ACSC NT), and player interface integrated circuit board (PIB) 209 connected to player interface devices 211 over bus lines 213, 217, 219, 221, 223. Printer 225 is connected to PIB 209 and GMU 207 over bus lines 227, 229. Base game integrated circuit board 203, PIB 209, and GMU 207 connect to Ethernet switch 231 over bus lines 233, 235, 237. Ethernet switch 231 connects to a slot management system (SMS) and a casino management system (CMS) network over bus line 239. GMU 207 also may connect to the SMS and CMS network over bus line 241. Speakers 243 connect through audio mixer 245 and bus lines 247, 249 to base game integrated circuit board 203 and PIB 209. The proximity and biometric devices and circuitry may be installed by upgrading a commercially available PIB 209, such as a Bally iView unit. Coding executed on base game integrated circuit board 203, PIB 209, and/or GMU 207 may be upgraded to integrate a game according to one or more embodiments of the present invention, as is more fully described herein.

Peripherals 251 connect through I/O board 253 to base game integrated circuit board 203. For example, a bill/ticket acceptor is typically connected to a game input-output board 253 which is, in turn, connected to a conventional central processing unit ("CPU") base game integrated circuit board 203, such as an Intel Pentium microprocessor mounted on a gaming motherboard. I/O board 253 may be connected to base game integrated circuit board 203 by a serial connection such as RS-232 or USB or may be attached to the processor by a bus such as, but not limited to, an ISA bus. The gaming motherboard may be mounted with other conventional components, such as are found on conventional personal computer motherboards, and loaded with a game program which may include a gaming machine operating system (OS), such as a Bally Alpha OS. Base game integrated circuit board 203 executes a game program that causes base game integrated circuit board 203 to play a game. In one embodiment, the game program provides a slot machine game having adjustable multi-part indicia. The various components and included devices may be installed with conventionally and/or commercially available components, devices, and circuitry into a conventional and/or commercially available gaming machine cabinet, examples of which are described above.

When a player has inserted a form of currency such as, for example and without limitation, paper currency, coins or tokens, cashless tickets or vouchers, electronic funds transfers or the like into the currency acceptor, a signal is sent by way of I/O board 253 to base game integrated circuit board 203 which, in turn, assigns an appropriate number of credits for play in accordance with the game program. The player may further control the operation of the gaming machine by way of other peripherals 251, for example, to select the amount to wager via electromechanical or touch screen buttons. The game starts in response to the player operating a start mechanism such as a handle or touch screen icon. The game program includes a random number generator to provide a display of randomly selected indicia on one or more displays. In some embodiments, the random generator may be physically separate from gaming machine 10; for example, it may be part of a central determination host system which provides random game outcomes to the game program. Thereafter, the player may or may not interact with the game through electromechanical or touch screen buttons to change the displayed indicia. Finally, base game integrated circuit board 203 under control of the game program and OS compares the final display of indicia to a pay table. The set of possible game outcomes may include a subset of outcomes related to the triggering of a feature game. In the event the displayed outcome is a member of this subset, base game integrated circuit board 203, under control of the game program and by way of I/O Board 253, may cause feature or bonus game play to be presented on a feature display or the bonus display according to the present invention.

Predetermined payout amounts for certain outcomes, including feature game outcomes, are stored as part of the game program. Such payout amounts are, in response to instructions from base game integrated circuit board 203, provided to the player in the form of coins, credits or currency via I/O board 253 and a pay mechanism, which may be one or more of a credit meter, a coin hopper, a voucher printer, an electronic funds transfer protocol or any other payout means known or developed in the art.

In various embodiments, the game program is stored in a memory device (not shown) connected to or mounted on the gaming motherboard. By way of example, but not by limitation, such memory devices include external memory devices, hard drives, CD-ROMs, DVDs, and flash memory cards. In an alternative embodiment, the game programs are stored in a remote storage device. In one embodiment, the remote storage device is housed in a remote server. The gaming machine may access the remote storage device via a network connection, including but not limited to, a local area network connection, a TCP/IP connection, a wireless connection, or any other means for operatively networking components together. Optionally, other data including graphics, sound files and other media data for use with the EGM are stored in the same or a separate memory device (not shown). Some or all of the game program and its associated data may be loaded from one memory device into another, for example, from flash memory to random access memory (RAM).

In one or more embodiments, peripherals may be connected to the system over Ethernet connections directly to the appropriate server or tied to the system controller inside the EGM using USB, serial or Ethernet connections. Each of the respective devices may have upgrades to their firmware utilizing these connections.

GMU 207 includes an integrated circuit board and GMU processor and memory including coding for network communications, such as the G2S (game-to-system) protocol from the Gaming Standards Association, Las Vegas, N.V., used for system communications over the network. As shown, GMU 207 may connect to card reader 255 through bus 257 and may thereby obtain player card information and transmit the information over the network through bus 241. Gaming activity information may be transferred by the base game integrated circuit board 203 to GMU 207 where the information may be translated into a network protocol, such as S2S, for transmission to a server, such as a player tracking server, where information about a player's playing activity may be stored in a designated server database.

PIB 209 includes an integrated circuit board, PID processor, and memory which includes an operating system, such as Windows CE, a player interface program which may be executable by the PID processor together with various input/output (I/O) drivers for respective devices which connect to PIB 209, such as player interface devices 211, and which may further include various games or game components playable on PIB 209 or playable on a connected network server and PIB 209 is operable as the player interface. PIB 209 connects to card reader 255 through bus 223, display 259 through video decoder 261 and bus 221, such as an LVDS or VGA bus.

As part of its programming, the PID processor executes coding to drive display 259 and provide messages and information to a player. Touch screen circuitry 263 interactively connects display 259 and video decoder 261 to PIB 209, such that a player may input information and cause the information to be transmitted to PIB 209 either on the player's initiative or responsive to a query by PIB 209. Additionally soft keys 265 connect through bus 217 to PIB 209 and operate together with display 259 to provide information or queries to a player and receive responses or queries from the player. PIB 209, in turn, communicates over the CMS/SMS network through Ethernet switch 231 and busses 235, 239 and with respective servers, such as a player tracking server.

Player interface devices 211 are linked into the virtual private network of the system components in gaming machine 201. The system components include the iView processing board and game monitoring unit (GMU) processing board. These system components may connect over a network to the slot management system (such as a commercially available Bally SDS/SMS) and/or casino management system (such as a commercially available Bally CMP/CMS).

The GMU system component has a connection to the base game through a serial SAS connection and is connected to various servers using, for example, HTTPs over Ethernet.

Through this connection, firmware, media, operating system software, gaming machine configurations can be downloaded to the system components from the servers. This data is authenticated prior to install on the system components.

The system components include the iView processing board and game monitoring unit (GMU) processing board. The GMU and iView can combined into one like the commercially available Bally GTM iView device. This device may have a video mixing technology to mix the EGM processor's video signals with the iView display onto the top box monitor or any monitor on the gaming device.

Figure 3:
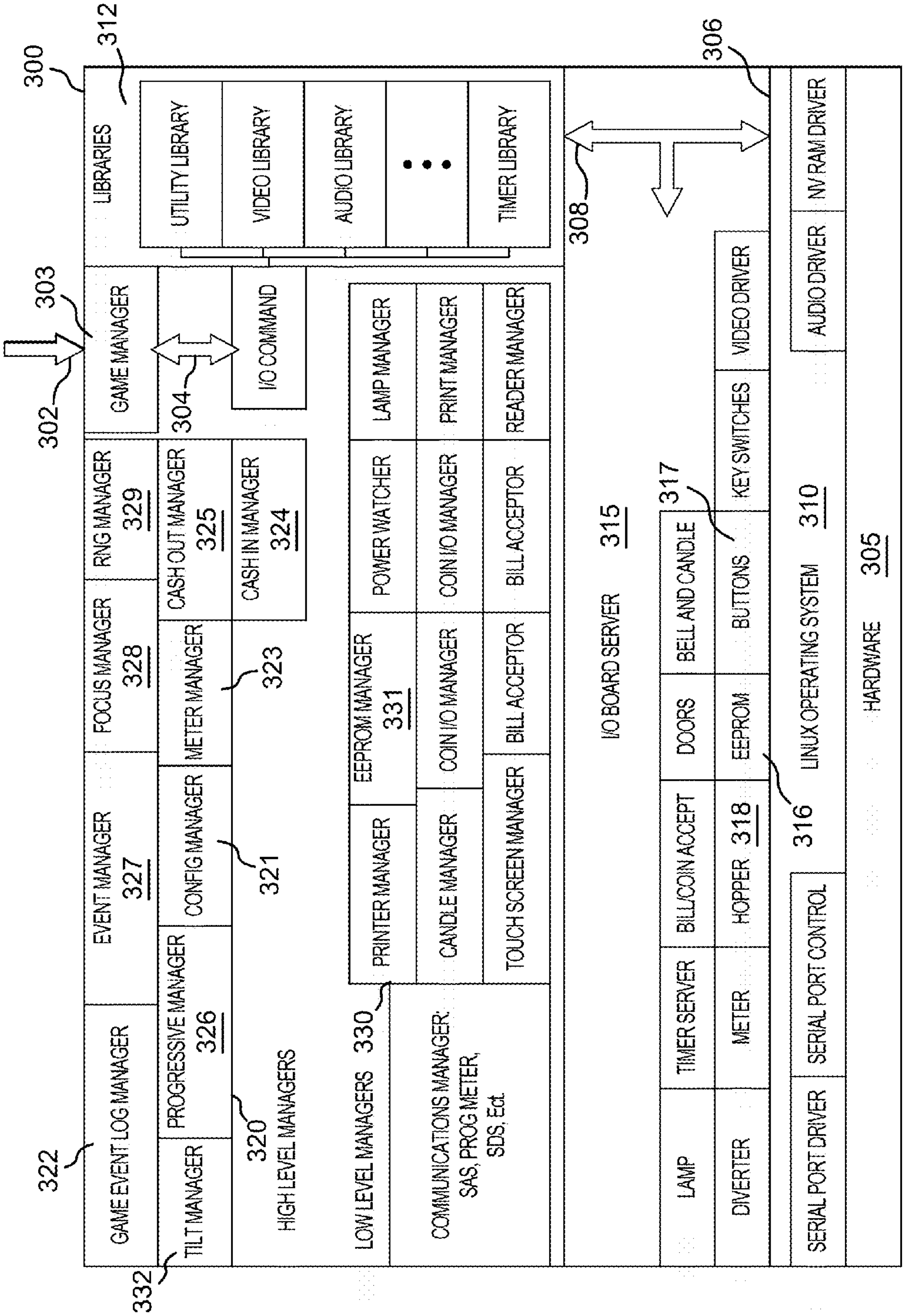
FIG. 3 is a block diagram of the logical components of a gaming kernel for a gaming device.

In accordance with one or more embodiments, FIG. 3 is a functional block diagram of a gaming kernel 300 of a game program under control of base game integrated circuit board 203. The game program uses gaming kernel 300 by calling into application programming interface (API) 302, which is part of game manager 303. The components of game kernel 300 as shown in FIG. 3 are only illustrative, and should not be considered limiting. For example, the number of managers may be changed, additional managers may be added or some managers may be removed without deviating from the scope and spirit of the invention.

As shown in the example, there are three layers: a hardware layer 305; an operating system layer 310, such as, but not limited to, Linux; and a game kernel layer 300 having game manager 303 therein. In one or more embodiments, the use of a standard operating system 310, such a UNIX-based or Windows-based operating system, allows game developers interfacing to the gaming kernel to use any of a number of standard development tools and environments available for the operating systems. This is in contrast to the use of proprietary, low level interfaces which may require significant time and engineering investments for each game upgrade, hardware upgrade, or feature upgrade. The game kernel 300 executes at the user level of the operating system 310, and itself contains a major component called the I/O Board Server 315. To properly set the bounds of game application software (making integrity checking easier), all game applications interact with gaming kernel 300 using a single API 302 in game manager 303. This enables game applications to make use of a well-defined, consistent interface, as well as making access points to gaming kernel 300 controlled, where overall access is controlled using separate processes.

For example, game manager 303 parses an incoming command stream and, when a command dealing with I/O comes in (arrow 304), the command is sent to an applicable library routine 312. Library routine 312 decides what it needs from a device, and sends commands to I/O Board Server 315 (see arrow 308). A few specific drivers remain in operating system 310's kernel, shown as those below line 306. These are built-in, primitive, or privileged drivers that are (i) general (ii) kept to a minimum and (iii) are easier to leave than extract. In such cases, the low-level communications is handled within operating system 310 and the contents passed to library routines 312.

Thus, in a few cases library routines may interact with drivers inside operating system 310, which is why arrow 308 is shown as having three directions (between library utilities 312 and I/O Board Server 315, or between library utilities 312 and certain drivers in operating system 310). No matter which path is taken, the logic needed to work with each device is coded into modules in the user layer of the diagram. Operating system 310 is kept as simple, stripped down, and common across as many hardware platforms as possible. The library utilities and user-level drivers change as dictated by the game cabinet or game machine in which it will run. Thus, each game cabinet or game machine may have an base game integrated circuit board 303 connected to a unique, relatively dumb, and as inexpensive as possible I/O adapter board, plus a gaming kernel 300 which will have the game-machine-unique library routines and I/O Board Server 315 components needed to enable game applications to interact with the gaming machine cabinet. Note that these differences are invisible to the game application software with the exception of certain functional differences (i.e., if a gaming cabinet has stereo sound, the game application will be able make use of API 302 to use the capability over that of a cabinet having traditional monaural sound).

Game manager 303 provides an interface into game kernel 300, providing consistent, predictable, and backwards compatible calling methods, syntax, and capabilities by way of game application API 302. This enables the game developer to be free of dealing directly with the hardware, including the freedom to not have to deal with low-level drivers as well as the freedom to not have to program lower level managers 330, although lower level managers 330 may be accessible through game manager 303's interface 302 if a programmer has the need. In addition to the freedom derived from not having to deal with the hardware level drivers and the freedom of having consistent, callable, object-oriented interfaces to software managers of those components (drivers), game manager 303 provides access to a set of high level managers 320 also having the advantages of consistent callable, object-oriented interfaces, and further providing the types and kinds of base functionality required in casino-type games. Game manager 303, providing all the advantages of its consistent and richly functional interface 302 as supported by the rest of game kernel 300, thus provides a game developer with a multitude of advantages.

Game manager 303 may have several objects within itself, including an initialization object (not shown). The initialization object performs the initialization of the entire game machine, including other objects, after game manager 303 has started its internal objects and servers in appropriate order. In order to carry out this function, the kernel's configuration manager 321 is among the first objects to be started; configuration manager 321 has data needed to initialize and correctly configure other objects or servers.

The high level managers 320 of game kernel 300 may include game event log manager 322 which provides, at the least, a logging or logger base class, enabling other logging objects to be derived from this base object. The logger object is a generic logger; that is, it is not aware of the contents of logged messages and events. The log manager's (322) job is to log events in non-volatile event log space. The size of the space may be fixed, although the size of the logged event is typically not. When the event space or log space fills up, one embodiment will delete the oldest logged event (each logged event will have a time/date stamp, as well as other needed information such as length), providing space to record the new event. In this embodiment, the most recent events will thus be found in the log space, regardless of their relative importance. Further provided is the capability to read the stored logs for event review.

In accordance with one embodiment, meter manager 323 manages the various meters embodied in the game kernel 300. This includes the accounting information for the game machine and game play. There are hard meters (counters) and soft meters; the soft meters may be stored in non-volatile storage such as non-volatile battery-backed RAM to prevent loss. Further, a backup copy of the soft meters may be stored in a separate non-volatile storage such as EEPROM. In one embodiment, meter manager 323 receives its initialization data for the meters, during start-up, from configuration manager 321. While running, the cash in and cash out managers 324, 325 call the meter manager's 323 update functions to update the meters. Meter manager 323 will, on occasion, create backup copies of the soft meters by storing the soft meters' readings in EEPROM. This is accomplished by calling and using EEPROM manager 331.

In accordance with still other embodiments, progressive manager 326 manages progressive games playable from the game machine. Event manager 327 is generic, like log manager 322, and is used to manage various gaming machine events. Focus manager 328 correlates which process has control of various focus items. Tilt manager 332 is an object that receives a list of errors (if any) from configuration manager 321 at initialization, and during game play from processes, managers, drivers, etc. that may generate errors. Random number generator manager 329 is provided to allow easy programming access to a random number generator (RNG), as a RNG is required in virtually all casino-style (gambling) games. RNG manager 329 includes the capability of using multiple seeds.

In accordance with one or more embodiments, a credit manager object (not shown) manages the current state of credits (cash value or cash equivalent) in the game machine, including any available winnings, and further provides denomination conversion services. Cash out manager 325 has the responsibility of configuring and managing monetary output devices. During initialization, cash out manager 325, using data from configuration manager 321, sets the cash out devices correctly and selects any selectable cash out denominations. During play, a game application may post a cash out event through the event manager 327 (the same way all events are handled), and using a call-back posted by cash out manager 325, cash out manager 325 is informed of the event. Cash out manager 325 updates the credit object, updates its state in non-volatile memory, and sends an appropriate control message to the device manager that corresponds to the dispensing device. As the device dispenses dispensable media, there will typically be event messages being sent back and forth between the device and cash out manager 325 until the dispensing finishes, after which cash out manager 325, having updated the credit manager and any other game state (such as some associated with meter manager 323) that needs to be updated for this set of actions, sends a cash out completion event to event manager 327 and to the game application thereby. Cash in manager 324 functions similarly to cash out manager 325, only controlling, interfacing with, and taking care of actions associated with cashing in events, cash in devices, and associated meters and crediting.

In a further example, in accordance with one or more embodiments, I/O server 315 may write data to the gaming machine EEPROM memory, which is located in the gaming machine cabinet and holds meter storage that must be kept even in the event of power failure. Game manager 303 calls the I/O library functions to write data to the EEPROM. The I/O server 315 receives the request and starts a low priority EEPROM thread 316 within I/O server 315 to write the data. This thread uses a sequence of 8 bit command and data writes to the EEPROM device to write the appropriate data in the proper location within the device. Any errors detected will be sent as IPC messages to game manager 303. All of this processing is asynchronous.

In accordance with one embodiment, button module 317 within I/O server 315, polls (or is sent) the state of buttons every 2 ms. These inputs are debounced by keeping a history of input samples. Certain sequences of samples are required to detect a button was pressed, in which case the I/O server 315 sends an inter-process communication event to game manager 303 that a button was pressed or released. In some embodiments, the gaming machine may have intelligent distributed I/O which debounces the buttons, in which case button module 317 may be able to communicate with the remote intelligent button processor to get the button events and simply relay them to game manager 303 via IPC messages. In still another embodiment, the I/O library may be used for pay out requests from the game application. For example, hopper module 318 must start the hopper motor, constantly monitor the coin sensing lines of the hopper, debounce them, and send an IPC message to the game manager 303 when each coin is paid.

Further details, including disclosure of lower level fault handling and/or processing, are included in U.S. Pat. No. 7,351,151 entitled "Gaming Board Set and Gaming Kernel for Game Cabinets" and provisional U.S. patent application No. 60/313,743, entitled "Form Fitting Upgrade Board Set For Existing Game Cabinets," filed Aug. 20, 2001; said patent and provisional are both fully incorporated herein by explicit reference.

Figure 4:
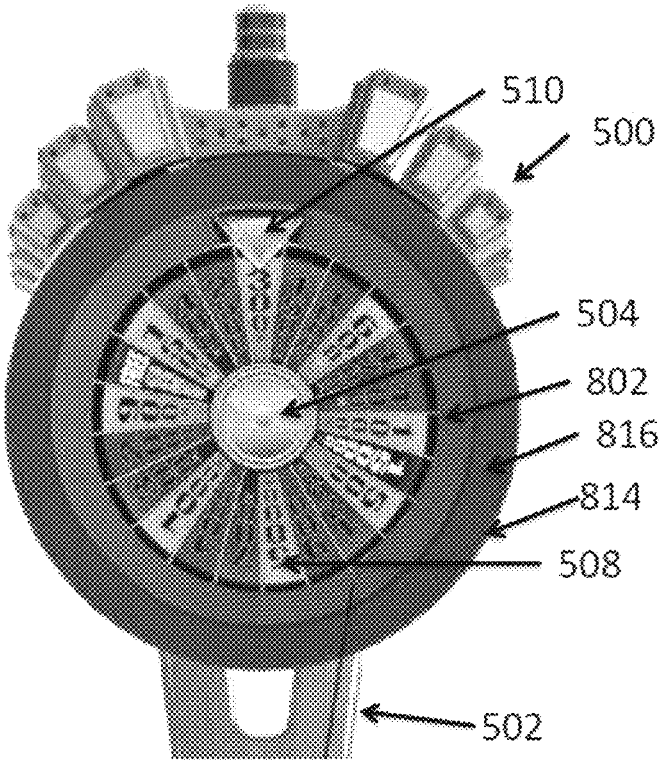
FIG. 4 illustrates an embodiment of the bonus display for a gaming device including a bonus video display showing a bonus wheel, pointer and award sectors according to the present invention.

FIG. 4 is a front view of a bonus display 500 according to the present invention. The bonus display 500 may be a separate device added to a gaming machine to, for example, stand from the gaming machine housing 12 or may be constructed to be an integral part of the gaming machine 10. An advantage to configuring the bonus display 500 to be a separate unit is that it may be mated to different gaming machines 10. The bonus display 500 includes a support 502 to support a square video display 504 preferably mounted in a diamond orientation to locate the corners 506*a-d* of the video display 504 along vertical and horizontal axes as shown in FIG. 6. The video display 504 is controlled by a separate controller/processor or the gaming device EGM processor board 203 to display a representation of a bonus wheel 508 including a plurality of sectors each displaying, for example, an award value in credits or a feature such as a number of free games to be awarded. When the bonus wheel 508 is enabled by, for example, a triggering outcome during the play of the base game, the video display 504 is controlled to simulate the spinning of the wheel 508 to register a sector with a pointer 510, also displayed in the video display, to indicate the award. While not shown, more than one pointer 510 may be provided up to, for example, four pointers 510 each displayed at a corner 506*a-d* of the square video display 504. In this fashion bonus game mechanics can be adopted to select one or multiple pointers for the bonus feature.

It should be that by providing a square bonus video display 504 and locating one or more pointers 510 at the corners 506*a-d* allocates a maximum amount of display real estate for the video display 504 to the bonus wheel 508. With reference to FIG. 6 it can be seen that very little display real estate is wasted. Where there are, for example, four pointers 510 each located at a corner 506*a-d* almost the entire display real estate is utilized.

FIG. 6 illustrates the square video display 504 with the display of the video wheel 508 and pointer 510. Inasmuch as the video wheel 508 is circular the bonus display 500 includes a structure, as hereinafter described, to frame the displayed wheel 508 and pointer(s) 510.

The aforementioned bonus display 500 is shown in a side view illustration in FIG. 7. The video display 504 is shown on edge as a flat screen, square video display 504. The video display 504 is mounted to the support 502 for presentation to the player. The video display 504 includes a front face 800 directed toward the player and displaying the bonus display 500 content. To provide an annular frame to surround the video display 504 the bonus display 500 includes a light diffusing inner ring 802 which may be fashioned from translucent, light diffusing, plastic. As can be seen, relative to the video display 504, the inner ring 802 may be angled as defined by a ring with a conical surface or may be somewhat rounded as a ring surface section of a toroid. To support the inner ring 802 a mounting 804 is provided. The mounting 804 may be a continuous or segmented annular mounting 804 or in may consist of spaced structures to support the inner ring 802. The inner ring 802 defines, with respect to a displayed wheel, an inner rim 806 disposed adjacent to the front face 800 and an outer rim 808 disposed spaced from the front face 800 by the mount 804. The shape of the inner ring 802 with the mount defines a closed annular space 810 surrounding the wheel 508 of the video display 504.

To illuminate the space 810 and light the inner ring 802 a first set of one or more light emitters 812 are distributed behind the annular inner ring 802. In a preferred embodiment the first set of light emitters 812 are spaced light emitting diodes (LEDs) mounted to the mount 804 to direct their emitted light radially (with respect to the annular inner ring 802) into the space 810. The first set of light emitters 812 may constitute other lighting means such as electroluminescent wire, neon or string lighting. To evenly and brightly illuminate the inner ring 802 and enhance the effect a layer 814 of reflective material is disposed in the space 810 to overlay the video display front face 800. The layer also masks light from the underlying portions of the video display 504. As indicated in FIG. 7 the reflected light from the first set of light emitters 812 lights the inner ring 802 from behind. By using the reflected light the first set of light emitters 812 do not produce light "hot spots" at the inner ring and produce an overall brighter and even lighting effect to the inner ring 802. In a preferred embodiment the inner rim 806 is closely adjacent to the front face 800 to block light from escaping from the space 810. The layer 814 may provide at least a partial light seal at the inner rim 806.

In an embodiment the bonus display 500 may include an illuminated outer ring 814 spaced from the inner ring 802 by an opaque, annular bezel 816. According to this embodiment the annular bezel 816 is mounted to the frame 804 spaced from the video display 504 front face 800. The outer ring 814 is also annular and may be defined by translucent material to confer "light pipe" functionality to the outer ring 814. Disposed on the mount 804 is a second set of a plurality of light emitters 818 such as LEDs or the other variety of lighting described above. The light emitters 818 emit light which is received by the outer ring 814 and transmitted to emit at its outer surface 820.

The first and second sets of light emitters 812, 818 may be controlled by a separate controller or may be controlled as peripherals by the EGM processor Board 203. The first and/or second sets of light emitters 812, 818 may be color LEDs and be controlled to emit and produce colors to enhance the visual effect of the bonus display 500. The color may include segmented RGB (red-green-blue) control for the displayed colors. For example, in an attract mode the inner and outer rings 802 and 814 may display a continuous, flashing or sequencing of colors to attract players. The inner and outer rings 802, 814 may be controlled by the controller to display lighting in coordination with the display of the wheel or with an event such as a bonus or game trigger.

Figure 5:
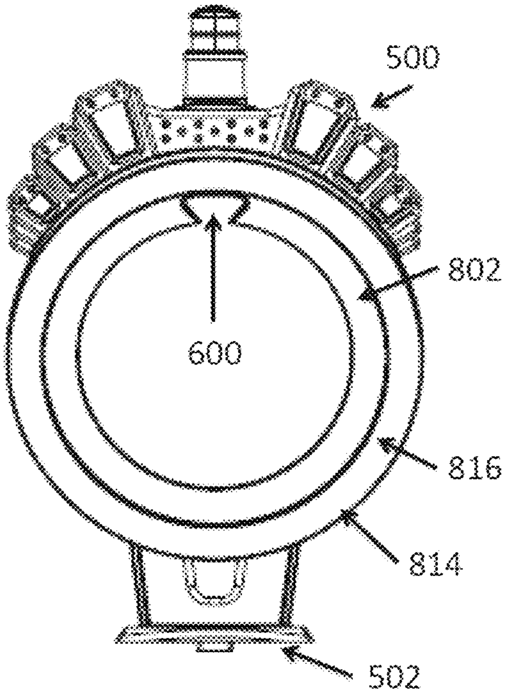
FIG. 5 illustrates the bonus display of FIG. 4 without the video display of the wheel and pointer according to the present invention.

Returning to FIGS. 4 and 5 to accommodate the display on the one or more pointers 508 the inner ring 802 includes a recess 600 which reveals the displayed pointer 510 on the video display 504. Where multiple pointers 510 are displayed the inner ring 802 would include a recess 600 for each such pointer 510.

A further advantage is that the foregoing construction provides a low profile look to players when seated below the bonus display 500.

Although the description above contains many specificities, these should not be construed as limiting the scope of the invention but as merely providing an illustration of the presently preferred embodiment of the invention. Thus the scope of this invention should be determined by the appended claims and their legal equivalents.

What is claimed is:

1. A bonus display for a gaming terminal of the type having a cabinet, a display to display a primary game and a game processor, said bonus display comprising:
- a support;
- a rectangular video display to display bonus feature content and secured to said support, said content including at least a video representation of a wheel;
- an annular light diffusing inner ring to surround the representation of said wheel, said inner ring comprising an inner rim comprising a first recess to accommodate a first corner-displayed video pointer, the inner ring adjoining the video display and an outer rim spaced from said video display to define an annular space wherein said rectangular video display is arranged in a diamond orientation with the video pointer displayed at the uppermost portion of the wheel;
- an annular reflector located adjacent said video display to underlie said inner ring;
- one or more light emitters to light said annular space, said light reflected by said reflector and illuminating said inner ring; and
- a controller to control said emitters to emit light.

2. The bonus display of claim 1 comprising said light emitters are light emitting diodes.

3. The bonus display of claim 2 comprising said controller is configured to control one or more of the color and lighting sequence of the light emitting diodes.

4. The bonus display of claim 2 comprising said light emitting diodes are arranged to emit radially into said annular space.

5. The bonus display of claim 1 comprising an annular opaque bezel disposed at said inner ring outer rim and an annular light transmitting outer ring mounted disposed to surround said bezel and a plurality of second light emitters arranged to emit light to said outer ring.

6. The bonus display of claim 1 wherein said rectangular video display is arranged in a diamond orientation and is controlled to display a second corner-displayed video pointer, said inner ring comprising a second recess to accommodate the display of the second video pointer.

7. The bonus display of claim 1 wherein said controller is configured to control said emitters in coordination with the display of said wheel.

8. A gaming device including a display for a primary game and a game controller, said gaming device comprising:
- a rectangular video display to display bonus feature content of at least a video representation of a bonus wheel;
- an annular light diffusing inner ring to surround the representation of said wheel, said inner ring comprising an inner rim comprising a first recess to accommodate a first corner-displayed video pointer, the inner ring adjoining the video display and an outer rim spaced from said video display to define an annular space wherein said rectangular video display is arranged in a diamond orientation with the video pointer displayed at the uppermost portion of the wheel;

an annular reflector located adjacent said video display to underlie said inner ring;

one or more light emitters to underlie said inner ring and to emit light into said annular space, said light reflected by said reflector and illuminating said inner ring; and a controller to control said emitters to emit light.

9. The gaming device of claim 8 comprising said light emitters are light emitting diodes.

10. The gaming device of claim 8 comprising said controller is configured to control one or more of the color and lighting sequence of the emitters.

11. The gaming device of claim 9 wherein said light emitting diodes are arranged to emit radially into said space.

12. The gaming device of claim 8 comprising an annular opaque bezel disposed at said inner ring outer rim and an annular light transmitting outer ring mounted disposed to surround said bezel and a plurality of second light emitters arranged to emit light to said outer ring.

13. The gaming device of claim 8 wherein said rectangular video display is arranged in a diamond orientation and is controlled to display a second corner-displayed video pointer, said inner ring including a second recess to accommodate the display of the second video pointer.

14. The gaming device of claim 8 wherein said controller is configured to control said emitters in coordination with the display of said wheel.

* * * * *